United States Patent
Holland et al.

(10) Patent No.: US 11,861,653 B1
(45) Date of Patent: Jan. 2, 2024

(54) CONTACT CENTER MANAGEMENT FOR CONTACT LIST GENERATION IN DATA COMMUNICATIONS SYSTEMS

(71) Applicant: 8×8, Inc., San Jose, CA (US)

(72) Inventors: Nick Holland, San Jose, CA (US); Lisa Clark, San Jose, CA (US); Vince Sweeney, San Jose, CA (US); Bryan R. Martin, San Jose, CA (US)

(73) Assignee: 8×8, Inc., Campbell, CA (US)

( * ) Notice: Subject to any disclaimer, the term of this patent is extended or adjusted under 35 U.S.C. 154(b) by 202 days.

(21) Appl. No.: 16/351,347

(22) Filed: Mar. 12, 2019

Related U.S. Application Data

(60) Provisional application No. 62/641,815, filed on Mar. 12, 2018.

(51) Int. Cl.
 *G06Q 30/0242* (2023.01)
 *G06Q 30/0202* (2023.01)
 (Continued)

(52) U.S. Cl.
 CPC ..... *G06Q 30/0243* (2013.01); *G06Q 30/0201* (2013.01); *G06Q 30/0202* (2013.01); *G06Q 30/0255* (2013.01)

(58) Field of Classification Search
 CPC ........... G06Q 30/0243; G06Q 30/0255; G06Q 30/0201; G06Q 30/0202
 See application file for complete search history.

(56) References Cited

U.S. PATENT DOCUMENTS 5,594,791 A 1/1997 Szlam et al.
7,606,359 B1 * 10/2009 Reding .................. H04M 3/51
                                                          379/267

(Continued)

FOREIGN PATENT DOCUMENTS

AU    2017101119 A4 *  9/2017
GB       2487734 B     8/2012

OTHER PUBLICATIONS

8×8, Inc. U.S. Appl. No. 16/351,339, filed Mar. 12, 2019. The Examiner is respectfully referred to the copending patent prosecution of the common Applicant/Assignee. No Attachment.

(Continued)

*Primary Examiner* — Mario C. Iosif
(74) *Attorney, Agent, or Firm* — Crawford Maunu PLLC

(57) ABSTRACT

Certain aspects of the disclosure are directed to contact center management, using a data communications server. According to a specific example, the data communications server includes one or more computer processor circuits coupled to memory circuits and configured to interface with a plurality of remotely-situated client entities. The data communications server may be configured and arranged to monitor a plurality of communications placed to target recipients in a first communications-based campaign of a first client entity among the plurality of remotely-situated client entities, and to determine a disposition of each of the plurality of communications based at least on data received and relating to the plurality of communications. Based at least in part on the disposition of the plurality of communications from the first communications-based campaign, data communications server may generate a contact list of target recipients for a second communications-based campaign associated with a second remotely-situated client entity.

20 Claims, 4 Drawing Sheets

(51) Int. Cl.
*G06Q 30/0251* (2023.01)
*G06Q 30/0201* (2023.01)

(56) References Cited

U.S. PATENT DOCUMENTS

| | | | | |
|---|---|---|---|---|
| 8,577,018 B1* | 11/2013 | Ben-Yair | ............. | H04M 3/5232 |
| | | | | 379/266.03 |
| 9,025,756 B1* | 5/2015 | Graham | ................ | G06Q 30/01 |
| | | | | 379/266.01 |
| 9,432,519 B1* | 8/2016 | Liu | ....................... | H04M 7/006 |
| 10,861,052 B1* | 12/2020 | Lopez | ................ | G06Q 30/0277 |
| 2005/0102355 A1* | 5/2005 | White | ................. | H04M 3/5232 |
| | | | | 709/204 |
| 2006/0062376 A1* | 3/2006 | Pickford | ............. | H04M 3/5235 |
| | | | | 379/265.12 |
| 2007/0172050 A1 | 7/2007 | Weinstein et al. | | |
| 2008/0091516 A1 | 4/2008 | Giunta | | |
| 2009/0196411 A1 | 8/2009 | Hawkins | | |
| 2010/0082801 A1* | 4/2010 | Patel | ...................... | G06Q 10/00 |
| | | | | 709/224 |
| 2012/0281825 A1* | 11/2012 | Segall | ................ | H04M 3/5141 |
| | | | | 379/265.1 |
| 2013/0110614 A1 | 5/2013 | Wagner et al. | | |
| 2013/0151332 A1 | 6/2013 | Yan et al. | | |
| 2013/0336472 A1* | 12/2013 | Fahlgren | ............... | H04M 3/523 |
| | | | | 379/266.01 |
| 2014/0136233 A1* | 5/2014 | Atkinson | ............... | G16H 10/60 |
| | | | | 705/3 |
| 2014/0289017 A1 | 9/2014 | Trenkle et al. | | |
| 2016/0021250 A1 | 1/2016 | Kumar et al. | | |
| 2016/0065739 A1* | 3/2016 | Brimshan | ........... | H04M 3/5231 |
| | | | | 379/88.01 |
| 2016/0379244 A1* | 12/2016 | Kalish | ................ | G06Q 30/0242 |
| | | | | 705/14.41 |
| 2017/0178182 A1* | 6/2017 | Kuskey | ................... | H04L 51/08 |
| 2018/0007202 A1 | 1/2018 | Batlle | | |

OTHER PUBLICATIONS

8×8, Inc. U.S. Appl. No. 16/351,351, filed Mar. 12, 2019. The Examiner is respectfully referred to the copending patent prosecution of the common Applicant/Assignee. No Attachment.

* cited by examiner

CONTACT CENTER MANAGEMENT FOR CONTACT LIST GENERATION IN DATA COMMUNICATIONS SYSTEMS

OVERVIEW

Aspects of various embodiments are directed to contact center management for contact list generation in data communications systems. In the following discussion, various implementations and applications are disclosed to provide an understanding of the instant disclosure by way of non-limiting example embodiments exemplified by way of one or more data-communications servers, such as server(s) operated on behalf of data-communications service providers, which provide users access to managed databases and/or services over the high throughput mediums. Non-limiting examples of data-communications service providers include ISPs (Internet Service Providers) and various other companies which provide Internet-related services such as email and search-engine services and more specialized computer-based services such as staffing software service, information technology management service, and/or customer relationship management services.

Among many other examples is a data communications service company providing services which include Voice over Internet Protocol (VoIP)-type data communications. VoIP communications typically involve a VoIP-type data-communications server communicating with a VoIP-enabled endpoint device ("VoIP device") via a broadband network (Internet, WiFi, cellular, satellite, etc.) to connect with such a (VoIP) server that is managed by a VoIP provider and/or an ISP. Through such a server, call routing and other data communications services are managed for the endpoint device.

Computer servers are increasingly being used to provide various services over a network including, but not limited to, data communications services such as VoIP calls, video conferencing, call exchange servers, packet switching, and traffic management as well as non-VoIP services including, but not limited to: website hosting, remote data storage, remote computing services, and virtual computing environments.

SUMMARY

Various example embodiments are directed to issues such as those addressed above and/or others which may become apparent from the following disclosure concerning contact center management in data communications systems.

In an example embodiment, a data communications server includes circuitry configured and arranged to provide data communications services to a plurality of remotely-situated client entities. In such example embodiment, the data communications server may monitor a plurality of communications placed to target recipients in a first communications-based campaign of a first client entity among the plurality of remotely-situated client entities, and determine a disposition of each of the plurality of communications based at least on data received and relating to the plurality of communications. Based at least in part on the disposition of the plurality of communications from the first communications-based campaign, the data communications server may generate a contact list of target recipients for a second communications-based campaign associated with a second remotely-situated client entity.

In another example embodiment, a data communications server includes one or more computer processor circuits coupled to memory circuits and configured to interface with a plurality of remotely-situated client entities. The data communications server is configured and arranged to monitor a plurality of communications generated by an automatic communication system associated with a first remotely-situated client entity among the plurality of remotely-situated client entities, the plurality of communications placed to target recipients in a first campaign of the first remotely-situated client entity. The data communications server is configured and arranged to receive data corresponding to the plurality of communications placed by the automatic contact system associated with the first remotely-situated client entity, and to determine a disposition of each of the plurality of communications based at least on the received data. Based at least in part on the disposition of the plurality of communications from the first communications-based campaign, the data communication server may generate a contact list of target recipients for a second communications-based campaign.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the drawings included in the attached Appendices and the accompanying drawings, in which.

Figure 1:
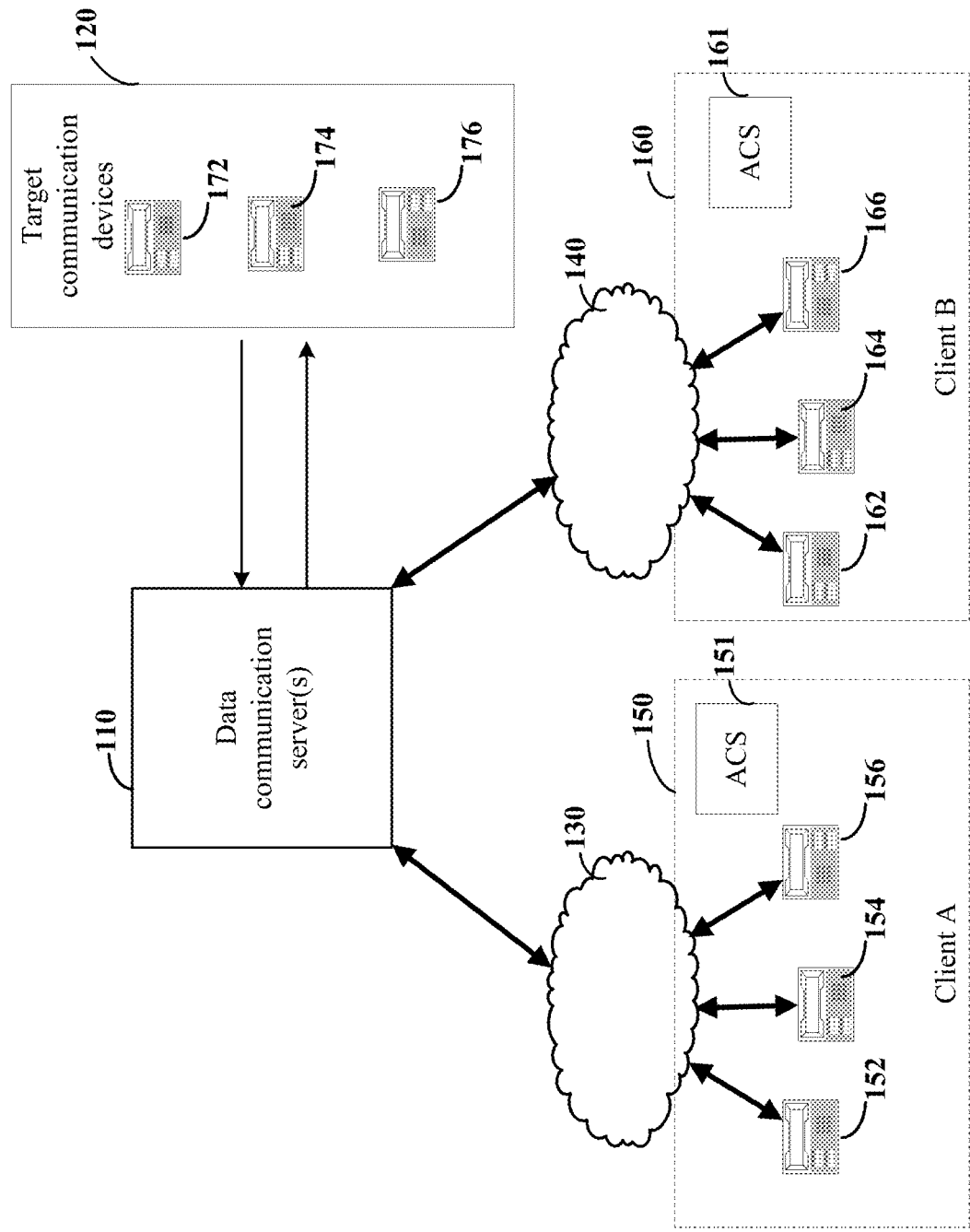
FIG. 1 shows a block diagram of a system for contact center management in data communications systems, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods for contact center management in data communications systems. In certain implementations, aspects of the present disclosure have been shown to be beneficial when used in a data communications system.

Many companies, in particular large companies that sell goods and services directly to consumers, operate data communications centers. A data communications center refers to or includes an interconnected system of data and/or voice-enabled devices including circuitry configured and arranged to provide data and/or voice services. A particular example of such services includes voice services, in which the data communications center includes a number of telephone operators (e.g., agents) who answer inbound calls from customers and/or place outbound calls to customers. A data communications center may operate to place large numbers of outbound communications to customers or potential customers, for instance for marketing purposes (e.g., telemarketing).

Such data communications centers may provide each agent with a list of customer identifiers, such as telephone numbers, usernames, email addresses, and/or user identifiers (among others) to manually contact the customer or potential customer. However, manual contact is time consuming, expensive and prone to error.

In accordance with examples of the present disclosure, contact lists may be provided using a data communications server. In various embodiments, the data communications server includes circuitry configured and arranged to provide data communications services to a plurality of remotely-situated client entities. In such embodiments, the data communications server may be configured and arranged to monitor a plurality of communications placed to target recipients in a first communications-based campaign of a first client entity among the plurality of remotely-situated client entities and determine a disposition of each of the plurality of communications based at least on data received and relating to the plurality of communications. Based at least in part on the disposition of the plurality of communications from the first communications-based campaign, the data communications server may generate a contact list of target recipients for a second communications-based campaign associated with a second remotely-situated client entity.

In various example embodiments, the plurality of communications are generated by an automatic contact system. In such embodiments, the data communications server is configured and arranged to receive from the automatic contact system, data corresponding to the plurality of communications placed by the automatic contact system, and determine a disposition of each of the plurality of communications based at least on data received from the automatic contact system. Additionally, the attributes which are used to analyze campaign performance and determine success of a particular campaign, may be customized by each respective client entity among the plurality of remotely-situated client entities.

Each respective campaign may include a plurality of targeted communications sent to targeted recipients in a contact list, with a particular frequency, on particular days, or at particular times of day with the intention of making sales, generating leads, marketing a brand, or performing market research.

In an additional example embodiment, the data communications server may monitor, for select client entities among the plurality of remotely-situated client entities, communications placed to target recipients in a respective communications-based campaign. For instance, a subset of the client entities receiving communications services from the data communications server may receive services related to targeted communications. For this subset of client entities, the communications forming the communications-based campaign may be monitored for data collection purposes. Accordingly, the data communication server may determine a disposition for each respective monitored communication, based on parameters defined by or on behalf of the respective client entity and relating to measurable communications metrics. The data communications server may compare attributes of other communications-based campaigns of the select client entities (or other campaigns for which the data communications server has data) and attributes of a particular communications-based campaign associated with one of the select client entities. As such, the data communications server may predict a success rate of the particular communications-based campaign based on the disposition of the monitored communications and the comparison of the attributes. In response to predicting (e.g., identifying) the success rate of the particular communications-based campaign, the data communications server may provide suggested modifications to the particular communications-based campaign based on the predicted success rate. For instance, the data communications server may generate a contact list of target recipients for a second communications-based campaign, based at least in part on the disposition of the plurality of communications from the first communications-based campaign.

Examples of the present disclosure allow users (e.g., customers and/or users of a data communications system) to create a fully customized contact center using a variety of tools provided by the data communications system over a network. With the customized contact center, users can create more efficient marketing campaigns using data collected by the data communications system. A marketing campaign (e.g., communications-based campaign, or simply "campaign"), as used herein, refers to and/or includes a plurality of agents placing calls and/or non-voice communications to targeted contacts, such as a customer contact list, with particular frequency, on particular days, and/or at particular times of day with the intention of making sales, generating leads, marketing a brand, and/or performing market research. As an illustration, attributes of a campaign for a first company may be compared to attributes of a campaign for a second company to determine the likely success of the campaign for the second company. Attributes of a marketing campaign may include a number of variables, including phone numbers or customer identifiers contacted, the day of the week in which each respective customer is contacted, the time of day each respective customer is contacted, and where the communications appeared to originate from, such as if a call appeared to originate from a local area code, among other example variables. In another illustration, attributes of a first campaign for a company may be used to generate a second call campaign for the company. For example, if particular times of day worked best to contact target customers as part of the first campaign for the company, the second campaign for the company may be structured to contact the target customers during the same times of day.

Examples of such a system include a data communications server comprising one or more computer processor circuits coupled to memory circuits and configured to interface with a plurality of remotely-situated client entities. The data communications server is configured and arranged to monitor a plurality of communications generated by an automatic contact system associated with a first remotely-situated client entity among the plurality of remotely-situated client entities, the plurality of communications placed to target recipients in a first campaign of the first client entity. The data communications server may receive data corresponding to the plurality of communications placed by the automatic contact system associated with the first remotely-situated client entity. For example, the data communications server may comprise a VoIP server configured and arranged to facilitate VoIP telephone calls between the remotely-situated client entity (e.g., the customer) and a target recipient (e.g., a phone number in a customer calling list of a call campaign). The data communications server may receive from the target recipient, data indicating whether the communication was answered or unanswered, dropped, connected to a message recording system, and a duration the communications, among other data associated with communications placed by the data communications server. The data communications server may determine a disposition of the plurality of communications based at least on the received data. The disposition of a communication may include one or more of the following: answered, unanswered, dropped or disconnected, invalid contact/customer identifier, incorrect contact/customer identifier, sale made, no sale made, and decision making contact contacted, among others.

The data communications server may compare attributes of the first campaign to attributes of a second campaign to determine the likelihood of success of the second campaign. In some examples, the second campaign may be a second campaign of the same customer. In other examples, the second campaign may be a campaign of a different customer (e.g., a different customer than the customer associated with the first call campaign).

The attributes which are used to analyze the campaign performance, and the objective which correlates with success of a particular campaign may be customized by each individual customer. For instance, a first company may specify that, for a particular campaign, agents in the data communications center for the first company must speak with a specified number or percentage of individuals in the contact list of the call campaign. As such, the attributes of the campaign which are analyzed to determine the success of the campaign may include variables such as the time of day that the communication(s) were placed, the day in which the communication(s) were placed, and the location from which the communication(s) appeared to originate, among other examples. The first company may specify that the campaign is "successful," if at least 50% of the communications placed were answered by a person.

As another illustration, the first company may specify that, for a particular campaign, at least 60% of the communications placed in the campaign must be answered by a decision maker, and at least 20% of the communications placed must result in a sale. As such, the attributes of the campaign which are analyzed to determine the success of the campaign may include variables such as whether the communication was answered by a person, whether the person was a decision maker, and whether the communication ended in a sale. The campaign may be considered "successful" if at least 60% of the communications were answered by a decision maker and at least 20% of the communications resulted in a sale. By using the data from a first campaign and comparing the attributes of the first campaign to attributes of a second campaign, a likelihood of success of the second campaign may be determined.

In some examples, the data communications server is configured and arranged to generate a contact list for a campaign, and to compare the campaign to previous campaigns to determine a likelihood of success. As an illustration, a company may generate a first campaign to sell goods to customers. The company may generate, using the data communications server, a first campaign to reach a list of customers to sell the goods to. The campaign may specify a contact list including a list of contacts to communicate with (e.g., in written form such as by email, instant message, text message, etc., or verbally such as by phone call, voice message, etc.), an order in which to contact the individuals and/or entities in the contact list, a date to contact each individual and/or entity in the contact list, a time to contact each individual and/or entity in the contact list, and an identifier to use as an originating identifier which may represent the company. As described herein, various attributes of the campaign may be set by the company which are used to determine the relative "success" of the campaign. For instance, the company may specify that the identifier of customers contacted in a specified period of time may determine the relative "success" of the campaign. The first campaign may be limited to a particular period of time, such as a specified week or month of a calendar year. Once the period of time corresponding to the first campaign is complete, the relative success or failure of the campaign may be determined by the data communications server.

Subsequently, the company may create a second campaign, using data from the first campaign. A second list of target recipients corresponding to the second campaign may be generated. Customers contacted in the first campaign may be automatically added and/or removed from the contact list of the second campaign. Attributes of the second campaign for the company may be the same and/or different from the first campaign. The attributes of the second campaign for the company may be compared to the attributes of the first campaign to determine a relative likelihood of success of the second campaign. For instance, assume for the sake of illustration that during the first campaign, a greater proportion of the communications placed in the evening hours during weekdays were answered. In this illustration, the day and time of the scheduled communications of the second campaign would be compared to the day and time in which the communications of the first campaign were placed. If the second campaign includes scheduled communications to the customers in the daytime hours during weekdays, then the likelihood of success of the second campaign may be low (e.g., below a specified threshold). Conversely, if the second campaign includes scheduled communications to the customers in the evening hours during weekdays, then the likelihood of success of the second campaign may be high (e.g., above a specified threshold). Accordingly, the data communications server may compare attributes of the second campaign of the first client entity to attributes of the first campaign of the first client entity, and identify a predicted success rate of the second campaign of the first client entity based on the comparison of the campaign attributes.

As described herein, data may be collected for different campaigns, and different attributes of the respective call campaigns may be used to determine the relative success of a particular campaign. For example, one variable that may be used to analyze the campaign performance may include "No Answer," which represents the number of outbound calls within a campaign that were unanswered by a person or an answer machine. Another variable that may be used includes "Sales per Hour," which represents an amount of sales made within a certain hour. Other variables include, "Call Duration," which represents the total duration of a connected call; "Total Answered," which represents the total number of answered calls; "Answer Machines," which represents the total number of calls connected to an answer machine; "Total Calls," which represents the total number of calls made; and "Total Completes," which represents the total number of completed records from a campaign. Additional variables include "Dead Lines," which represents the total number of dead lines from a campaign; "Total DMCs," which represents the total number or decision making contacts that were contacted; "Inbound Abandons," which represents the total number of inbound calls which were abandoned; "Manual Dials & TPTs," which represents the total number of manual calls or third party transfer calls made; "Outbound Abandons," which represents the total number of outbound calls which were abandoned; "Total Sales," which represents the total number of sales from a campaign; and "Uncontacted," which represents the total number of records that were uncontacted. It is noted however, that additional and/or different variables may be included in a particular call campaign, and the list provided above is merely illustrative.

Additionally, examples of the present disclosure allow users (e.g., customers and/or users of a data communications system) to create customized contact lists for particular campaigns, using data collected by the data communications system. For example, a first company may contact a plurality of individuals and/or entities as part of a campaign. Some of the individuals and/or entities contacted by the first company may be disconnected, incorrect, or otherwise unsuitable for a campaign. Such "bad" contacts waste time and resources if they are included in a campaign. Accordingly, the data communications system may assist a second company, by identifying and removing "bad" contacts from campaigns, thereby improving the success and efficiency of the campaign for the second company. In another illustration, contact lists of a first campaign for the first company may be used to generate contact lists of a second campaign for the first company. For example, if particular individuals and/or entities on the contact list of the first campaign were identified as disconnected or incorrect contacts during the first campaign, these identified contacts may be removed from a second (and perhaps subsequent) campaign for the first company.

Examples of such a system include a data communications server comprising one or more computer processor circuits coupled to memory circuits and configured to interface with a plurality of remotely-situated client entities. The data communications server is configured and arranged to monitor a plurality of communications generated by an automatic contact system associated with a first remotely-situated client entity among the plurality of remotely-situated client entities, the plurality of communications placed to target recipients in a first campaign of the first remotely-situated client entity. The data communications server is further configured and arranged to receive data corresponding to the plurality of communications placed by the automatic contact system associated with the first remotely-situated client entity, as described herein. The data communications server is configured and arranged to determine a disposition of each of the plurality of data communications based at least on the received data, and to generate a customer contact list for a second campaign associated with a second remotely-situated client entity, based at least in part on the disposition of the plurality of telephone calls from the call campaign.

In some examples, the data communications server is configured and arranged to identify target recipients of the first campaign, and remove the identified target recipients from subsequent campaigns. For instance, the data communications server may identify communications in the first campaign that were answered but did not result in a sale (e.g., had a disposition indicative of an unsuccessful sale). The data communications server may remove the identified target recipients from subsequent campaigns for the first remotely-situated client entity.

In some examples, the data communications server is configured and arranged to identify target recipients of a campaign from one customer (e.g., a first remotely-situated client entity), and remove the identified target recipients from campaigns from another customer. For instance, the data communications server may identify target recipients of the first campaign that answered the sales call, but that did not result in a sale (e.g., had a disposition indicative of an unsuccessful solicitation). The data communications server may remove the identified target recipients from a campaign for the second customer (e.g., a second remotely-situated client entity).

In yet another example, the data communications server may identify target recipients of the first campaign that had a disposition indicative of a bad contact/customer identifier (e.g., a phone number called in the first campaign was either incorrect, disconnected, or otherwise invalid). In such examples, the data communications server may remove the identified target recipients (e.g., the "bad" phone number(s)) from a campaign for the second customer (e.g., a second remotely-situated client entity).

In some examples, the data communications server is configured and arranged to automatically adjust a campaign based on data collected from previous campaigns. For instance, the data communications server may identify particular days or times of day when each respective target recipient of a first campaign were contacted, and which of those communications had a disposition indicative of a completed sale. The data communications server may identify that a greater proportion of the communications in the first campaign resulted in a completed sales when they were placed on a particular day or time of day. Thereby, the data communications server may automatically adjust the particular days or times of day to communicate with the target recipients in a subsequent campaign. The subsequent campaign may be a second campaign for the same customer (e.g., the same remotely-situated client entity), or a different customer (e.g., a second remotely-situated client entity).

Turning now to the figures, FIG. 1 shows a block diagram of a system for contact center management in data communications systems, consistent with embodiments of the present disclosure. The system includes a data communications server 110 configured to provide data communications for a plurality of endpoint devices 152, 154, 156, 162, 164, and 166 connected in one or more data networks 130 and 140. The endpoint devices may include VoIP-enabled devices (e.g., IP phones, smart phones, tablets, and/or desktop computers with appropriate VoIP software applications) and/or non-VoIP endpoint devices (e.g., plain old telephone service (POTS) telephones and cellular-capable devices). Each endpoint device is respectively associated with an account of a remotely-situated client entity. Endpoint devices may be associated with a particular remotely-situated client entity by registering the endpoint device with a particular remotely-situated client entity serviced by the data communications server. Registered devices for each remotely-situated client entity may be listed in a respective account settings file (not shown) stored by the data communications servers 110. In this example, endpoint devices 152, 154, and 156 are associated with an account 150 for a first remotely-situated client entity (e.g., "Client A") and endpoint devices 162, 164, and 166 are associated within an account 160 for a second remotely-situated client entity (e.g., "Client B").

Each remotely-situated client entity (e.g., client A 150 and client B 160) may include a respective automatic contact system (ACS) 151 associated with client A and ACS 161 associated with client B. The automatic contact system facilitates the contacting of individuals and/or entities specified in a contact list, such as that provided in a campaign for the associated client entity. For example, the automatic contact system 151, via the data communications server 110, may contact the individuals and/or entities specified in a particular contact list provided by client A. The automatic contact system may also automatically identify message recording systems and dispose of communications without connecting an agent to the message recording system. In some examples, the automatic contact system may include a predictive contact system, which analyzes a series of statistics characterizing the instantaneous and average capacity of data communications center agents to handle more communications in order to predict how many individuals and/or entities to contact simultaneously. The use of predictive contact systems minimizes agent waiting time by contacting multiple individuals and/or entities per agent who is currently able to handle a new communication, or who is predicted to soon be available to handle a new communication. Among other parameters, predictive contact systems analyze each agent's expected communication time, the number of agents actually waiting to handle a communication and the likelihood of an attempted communication with any particular individual and/or entity contacted being answered. Once connections are made the communication is connected to an available agent.

As illustrated in FIG. 1, the data communications server 110 is communicatively coupled to a plurality of target communications devices 120. The data communications server 110 connects the contact system from the respective client with a number and/or identifier associated with each of the respective target communications devices 120. Each target communications device may be associated with an identifier corresponding to a particular individual and/or place of business. For example, the target communications devices may include telephones associated with a particular individuals and/or a places of business. Additionally and/or alternatively, the target communications devices may include computing devices associated with particular individuals and/or places of business, such as desktop computers and/or portable computers. Each target communications device may be associated with an address, phone number, or other identifier by which the data communications server 110 may identify it.

As an illustration, the data communications server 110 may connect device 152 from client A with each of target communications devices 172, 174, and 176 in a sequential manner, via the contact system 151, as part of a campaign for client A. As described herein, a campaign refers to and/or includes a plurality of agents communicating with targeted individuals and/or entities (e.g., customer calling lists) with the intention of making sales, generating leads, marketing a brand, and/or performing market research.

Figure 2:
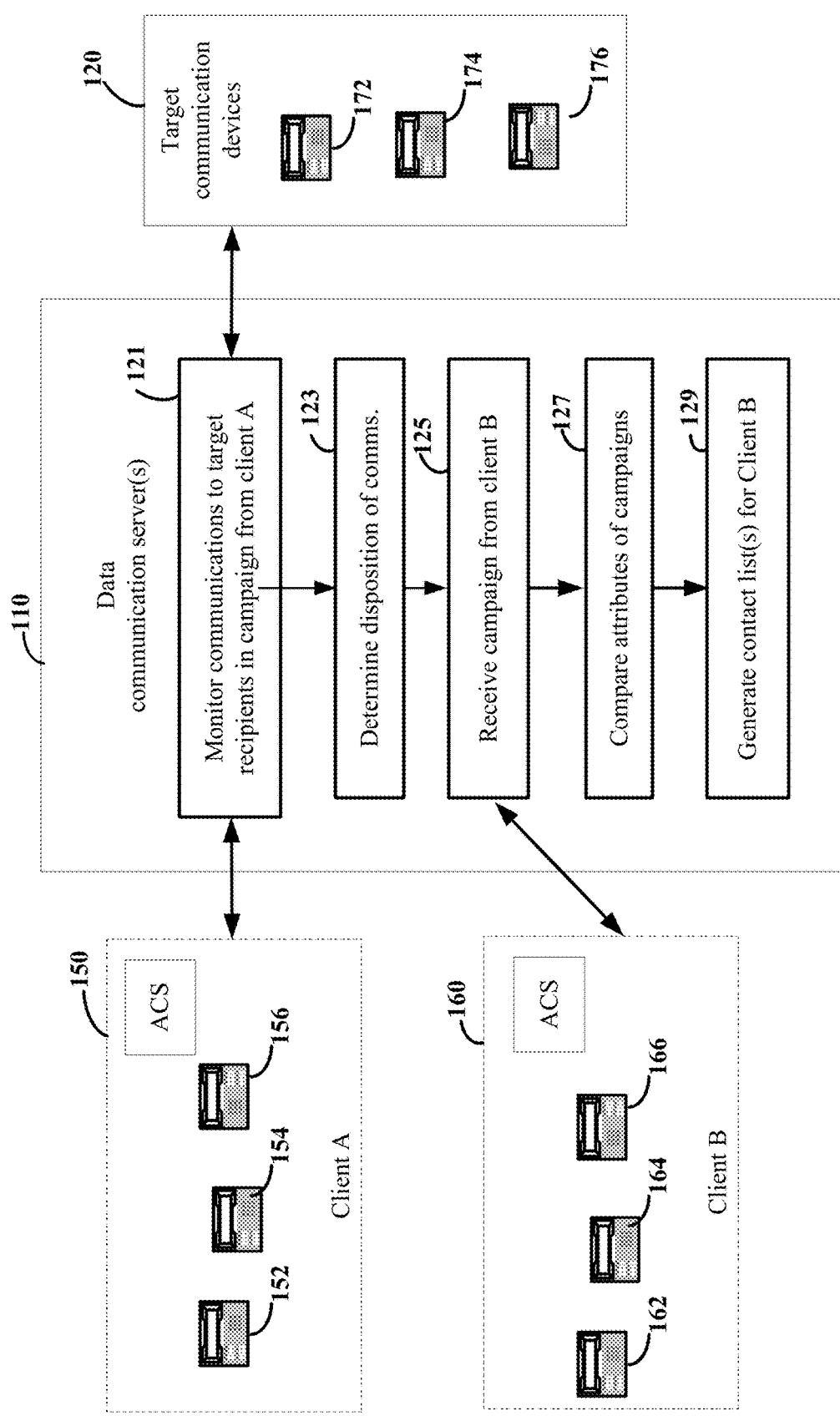
FIG. 2 shows an example flowchart for management of a data communications center, consistent with embodiments of the present disclosure.

FIG. 2 shows an example flowchart for management of a data communications center, consistent with embodiments of the present disclosure. As illustrated in FIG. 2, a data communications server 110 can facilitate communication between data communications center clients and target communications devices 120. The data communications server 110 can include one or more computer processor circuits coupled to memory circuits and configured to interface with a plurality of remotely-situated client entities (e.g., client A and client B). Each of the data communication center clients and the target communications devices may be remotely situated with regard to the data communications server. At 121, the data communications server 110 may be configured and arranged to monitor a plurality of communications generated by an automatic contact system associated with a first remotely-situated client entity among the plurality of remotely-situated client entities (such as client A). In such an example, the plurality of communications placed to the target communications device 120 are included in a first campaign of the first client entity. The data communications server 110 may receive from each target communications device 120, data indicating whether the communication was answered, not answered, dropped, etc. At 123, the data communications server 110 may be configured and arranged to determine a disposition of the communications placed to the target communications devices 120 based at least on the received data. At 125, the data communications server 110 may be configured and arranged to receive a campaign from another remotely-situated client entity, such as client B. At 127, the data communications server 110 may be configured and arranged to compare attributes of the campaign of client A (e.g., the first campaign) with attributes of the campaign of client B (e.g., the second campaign). In some example embodiments, the data communications server 110 may be configured and arranged to determine (e.g., predict) a success rate of the second campaign based on the disposition of the communications of the first campaign, as described herein. Although FIG. 1 illustrates comparing a campaign of one remotely-situated client entity with a campaign of a second remotely-situated client entity, examples are not so limited. For instance, the data communications server may compare a first campaign of client A to a second campaign of client A, and determine a success rate of the second campaign based on the comparison. At 129, the data communications server 110 may be configured and arranged to generate contact lists for the Client B campaign. For instance, customers contacted in the first campaign may be automatically added and/or removed from the contact list of the second campaign based on the comparison and determined success rate. As another illustration, if particular individuals and/or entities on the contact list of the first campaign were identified as disconnected or incorrect contacts during the first campaign, these identified contacts may be removed from a second (and perhaps subsequent) campaign.

Figure 3:
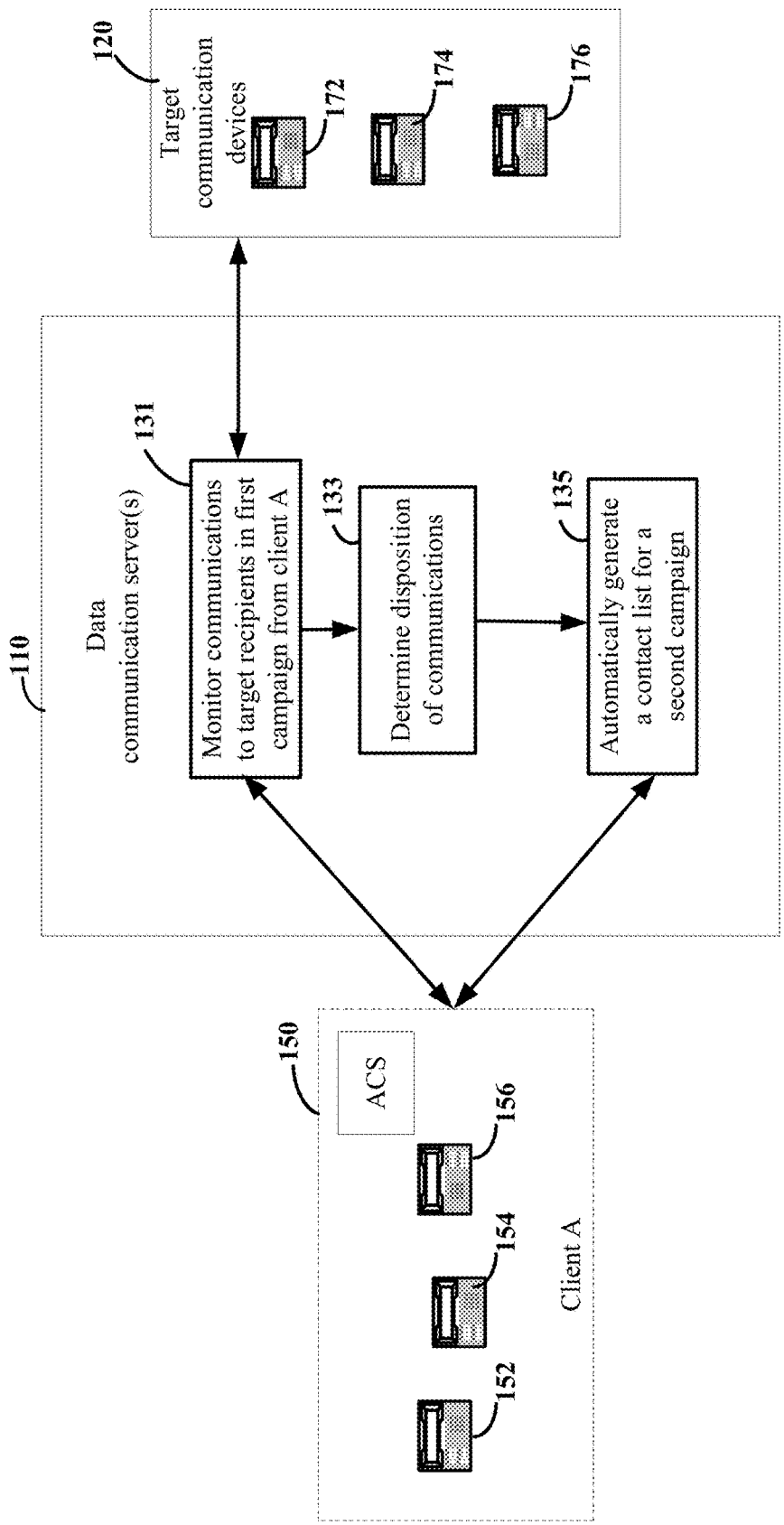
FIG. 3 shows an example flowchart for management of a data communications center, consistent with embodiments of the present disclosure.

FIG. 3 shows an example flowchart for management of a data communications center, consistent with embodiments of the present disclosure. As illustrated in FIG. 3, a data communications server 110 can facilitate communication between data communications center clients and target communications devices 120. The data communications server 110 can include one or more computer processor circuits coupled to memory circuits and configured to interface with a plurality of remotely-situated client entities (e.g., client A and client B). Each of the data communications center clients and the target communications devices may be remotely situated with regard to the data communications server. At 131, the data communications server 110 may be configured and arranged to monitor a plurality of communications generated by an automatic contact system associated with a first remotely-situated client entity among the plurality of remotely-situated client entities (such as client A). In such an example, the plurality of telephone calls placed to the target communications device 120 are included in a first campaign of the first client entity. The data communications server 110 may receive from each target communications device 120, data indicating whether the communication was answered, not answered, dropped, etc. At 133, the data communications server 110 may be configured and arranged to determine a disposition of the communications placed to the target communications devices 120 based at least on the received data. At 135, the data communications server 110 may be configured and arranged to generate a customer contact list for a second campaign associated with a second remotely-situated client entity (such as client B), based at least in part on the disposition of the plurality of communications from the first campaign (e.g., the campaign from client A). Although FIG. 2 illustrates generating a customer contact list for client B based on a disposition of communications from client A, examples are not so limited. For instance, the data communications server may generate a second customer calling list for client A, based on the disposition of the communications from the first campaign of client A.

Figure 4:
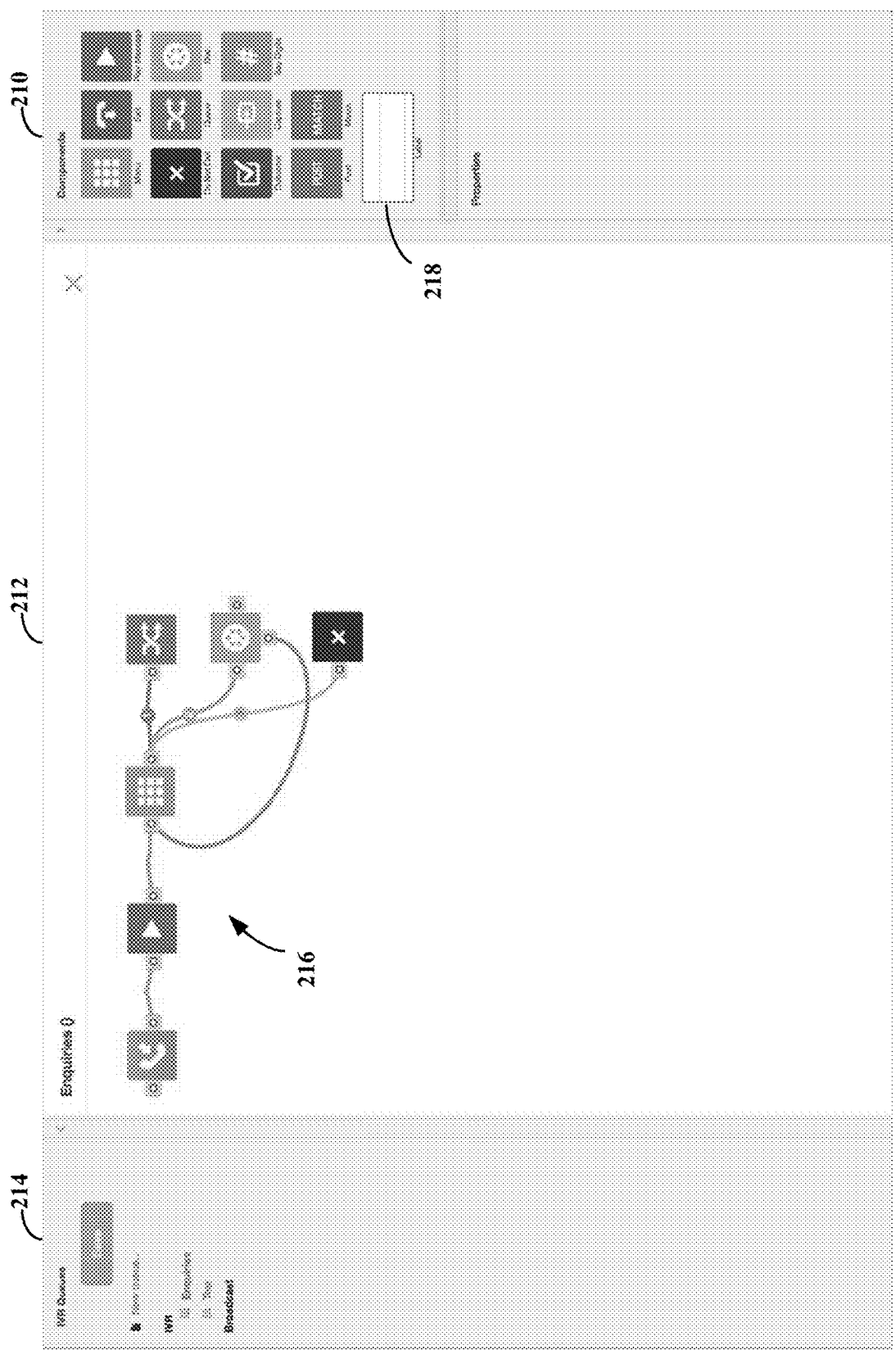
FIG. 4 illustrates an example graphical user interface (GUI) for data communications center management, consistent with embodiments of the present disclosure.

FIG. 4 illustrates an example graphical user interface (GUI) for data communications center management, consistent with embodiments of the present disclosure. As described with regard to FIGS. 1-3, a system of call center management in accordance with the present disclosure may include a plurality of remotely-situated client entities communicatively coupled to a data communications server. Each of the remotely-situated client entities may include at least one computing device including a user interface. Also, the data communications server may include one or more computer processor circuits coupled to memory circuits and configured to interface with the plurality of remotely-situated client entities. The data communications server may be configured and arranged to provide a GUI as illustrated, in part, in FIG. 4.

In some examples, the data communications server is configured and arranged to provide a GUI for each respective remotely-situated client entity. The GUI provided to each respective remotely-situated client entity may include a display of campaigns, interactive voice recognition (IVR) tools, and data analytics. Also, the GUI provided to each respective remotely-situated client entity may include a display including selectable components to customize for the associated remotely-situated client entity, a customization for handling incoming communications by the IVR system. For instance, referring to FIG. 4, the data communications server may provide a display on the GUI including selectable components 210 to create customized IVR queues specifying a manner of handling incoming communications for the associated remotely-situated client entity. The GUI may further include a display 214 of all previous IVR queues generated by the remotely-situated client entity, and an option to create a new IVR queue. Additionally, the GUI may include a region 212 for drag and drop configuration of the selectable components in a flow chart 216 that represents the IVR queue.

Each component displayed in region 212 may be connected, as illustrated in FIG. 4. Additionally the selectable components may be moved, added, and/or removed. In some examples, the flow chart includes multiple paths for the IVR queue. For instance, the IVR queue may include a first path representing normal data communications routing operation, a second path representing an error in a data communications routing operation, a third path representing a timeout condition, and a fourth path representing a retry operation. The selectable components 210 may be selected, dragged, and dropped in region 212, and connected within the flow chart 216 in a user-configurable manner. While FIG. 4 illustrates a flow chart including six (6) different selectable components comprising the IVR queue, the IVR queue may include more or fewer selectable components than illustrated. Similarly, a customized IVR queue may include redundant selectable components. For instance, flow chart 216 includes a single "play message" component and a single "menu" component. In accordance with the present disclosure, the flow chart 216 may include two (or more) "menu" components at different locations within the flow chart 216, and/or two (or more) "play message" components different locations within the flow chart 216. An additional selectable component 218 allows the user to label the created IVR queue for further retrieval. For instance, the created IVR queue may be displayed in display 214 for subsequent retrieval and/or modification.

Various embodiments are implemented in accordance with the underlying Provisional Application (Ser. No. 62/641,815), entitled "Contact Center Management In Data Communications Systems," filed Mar. 12, 2018, to which benefit is claimed and which are fully incorporated herein by reference. For instance, embodiments herein and/or in the provisional application may be combined in varying degrees (including wholly). Reference may also be made to the teachings and underlying references provided in the underlying provisional application. Embodiments discussed therein are not intended, in any way, to be limiting to the overall technical disclosure, or to any part of the claimed invention unless specifically noted.

Various blocks, modules or other circuits may be implemented to carry out one or more of the operations and activities described herein and/or shown in the figures. As examples, the Specification describes and/or illustrates aspects useful for implementing the claimed disclosure by way of various circuits or circuitry using terms such as blocks, modules, device, system, unit, controller, and the like. In these contexts, a "block" (also sometimes "logic circuitry" or "module") is a circuit that carries out one or more of these or related operations/activities. For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server includes a computer processing circuit that is configured to provide services to other circuit-based devices. Moreover, an endpoint device (or endpoint) includes a communication circuit and (computer) processing circuits which are configured to establish (data) communication sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A data communications server comprising:
one or more computer processor circuits coupled to memory circuits and configured to interface with a plurality of remotely-situated client entities, wherein the data communications server is configured to provide data communications services to each of the plurality of remotely-situated client entities, and to:
provide a graphic user interface (GUI) for each respective one of the plurality of remotely-situated client entities, the GUI to provide a display of different campaigns, and configured with interactive voice recognition (IVR) tools of an IVR system and data analytics and with user-customization abilities to handle incoming communications by the IVR system, wherein the GUI and the display are to be operated by a user of the display locating and arranging selectable components to customize a set of user-configurable paths for forming at least one IVR queue and therein to customize for the respective one of the plurality of remotely-situated client entities to handle the incoming communications via a user-customized arrangement of the selectable components, wherein the selectable components include a selectable component to allow a created IVR queue to be labeled for subsequent retrieval and further include three or more of the following: menu, exit or terminate, play message, do not call, dial, outcome, capture, say digits, post and match;
monitor, via the data communications services, a plurality of communications placed to target recipients in a first communications-based campaign of a first client entity among the plurality of remotely-situated client entities, and the first communications-based campaign being from among the different campaigns;
determine a disposition of each of the plurality of communications based at least on data received and relating to the plurality of communications; and
generate a contact list of target recipients for a second communications-based campaign associated with a second remotely-situated client entity, based at least in part on the disposition of the plurality of communications from the first communications-based campaign, wherein the first communications-based campaign is a marketing campaign through which marketing-related communications are made on behalf of the first client entity via the data communications server to targeted contacts, and wherein the data communications server is to adjust or set attributes, and use the adjusted or set attributes, in the first communications-based campaign and/or the second communications-based campaign based on marketing-related communications of the first communications-based campaign, wherein the attributes include one or more variables selected from among: identification of target recipients contacted through the first communications-based campaign, identification of time and day of the week in which each respective customer is contacted via the first communications-based campaign.

2. The data communications server of claim 1, including a predictive automatic contact system (ACS) to connect, via the data communications server, selected calls to agents of the first client entity based on a predictive statistical analysis associated with capacity of each of the agents to handle a new communication, wherein the marketing-related communications concern efforts towards making sales, marketing a brand, and/or performing market research, and wherein the plurality of communications are generated by the ACS, and wherein the data communications server is configured and arranged to:
receive from the automatic contact system, data corresponding to the plurality of communications placed by the automatic contact system; and
determine a disposition of each of the plurality of communications based at least on data received from the automatic contact system.

3. The data communications server of claim 1, wherein the data communications server is to identify target recipients of the first communications-based campaign that had a disposition indicative of an unsuccessful solicitation, and remove the identified target recipients from subsequent communications-based campaigns for the first remotely-situated client entity.

4. The data communications server of claim 1, wherein the data communications server is to automatically add target recipients included in the first communications-based campaign to the target recipients included in the second communications-based campaign, based at least in part on the disposition of the plurality of communications from the first communications-based campaign.

5. The data communications server of claim 1, wherein the data communications server is to automatically remove target recipients included in the first communications-based campaign to the target recipients included in the second communications-based campaign, based at least in part on the disposition of the plurality of communications from the first communications-based campaign.

6. The data communications server of claim 1, wherein the disposition of each respective communication includes at least one of the following: answered, unanswered, dropped or disconnected, invalid contact, incorrect contact, sale made, no sale made, and decision making contact contacted.

7. The data communications server of claim 1, wherein attributes which are used to analyze campaign performance and determine success of a particular campaign, are customized by each respective client entity among the plurality of remotely-situated client entities.

8. The data communications server of claim 1, wherein each respective campaign includes a plurality of targeted communications sent to targeted recipients in a contact list, with a particular frequency, on particular days, or at particular times of day with an intention of making sales, generating leads, marketing a brand, or performing market research.

9. The data communications server of claim 1, wherein the data communications server is to identify target recipients of the first communications-based campaign that had a disposition indicative of an unsuccessful solicitation, and remove the identified target recipients from the second communications-based campaign for the second remotely-situated client entity.

10. The data communications server of claim 1, wherein the data communications server is to identify particular days or times of day for each respective target recipient of the first communications-based campaign that had a disposition including a completed sales call, and automatically adjust the particular days or times of day to contact the target recipients of the second communications-based campaign of the second remotely-situated client entity based on the identification.

11. A method for contact list generation, using a data communications server, wherein the data communications server includes circuitry to provide data communications services to a plurality of remotely-situated client entities, the method comprising:
providing a graphic user interface (GUI) for each respective one of the plurality of remotely-situated client entities, the GUI to provide a display of different campaigns, and configured with interactive voice recognition (IVR) tools of an IVR system and data analytics and with user-customization abilities for handling incoming communications by the IVR system, wherein the GUI and the display are to be operated by a user of the display locating and arranging selectable components in a region of the display to customize a set of user-configurable paths for forming at least one IVR queue to customize for the respective one of the plurality of remotely-situated client entities to handle the incoming communications via selectable components as customized by the user, wherein the selectable components include a selectable component to allow a created IVR queue to be labeled for subsequent retrieval and further include three or more of the following: menu, exit or terminate, play message, do not call, dial, outcome, capture, say digits, post and match;
monitoring a plurality of communications placed to target recipients in a first communications-based campaign of a first client entity among the plurality of remotely-situated client entities, and the first communications-based campaign being from among the different campaigns;
determining a disposition for each respective communication among a plurality of communications placed to target recipients in a first campaign of a first client entity among the plurality of client entities, based on parameters defined by or on behalf of the respective client entity and relating to measurable communications metrics; and
generating a contact list of target recipients for a second communications-based campaign, based at least in part on the disposition of the plurality of communications from the first communications-based campaign.

12. The method of claim 11, wherein the data communications server generates contact lists by:
identifying target recipients of the first campaign that had a disposition indicative of a bad contact identifier; and
removing the identified target recipients associated with the bad contact identifier from the second communications-based campaign.

13. The method of claim 11, wherein the data communications server generates contact lists by:
determining the disposition for each respective communication in the first campaign of the first client entity; and
generating a contact list of target recipients for a second communications-based campaign associated with a second remotely-situated client entity, based at least in part on the disposition of the plurality of communications from the first communications-based campaign.

14. The method of claim 11, wherein the data communications server is generates contact lists by:
determining the disposition for each respective communication in the first campaign of the first client entity; and
generating a contact list of target recipients for a second communications-based campaign associated with the first client entity, based at least in part on the disposition of the plurality of communications from the first communications-based campaign.

15. A data communications server comprising:
one or more computer processor circuits coupled to memory circuits and configured to interface with a plurality of remotely-situated client entities, wherein the data communications server is to:
provide a graphic user interface (GUI) for each respective one of the plurality of remotely-situated client entities, the GUI to provide a display of different campaigns, and configured with interactive voice recognition (IVR) tools of an IVR system and data analytics and with user-customization abilities for handling incoming communications by the IVR system, wherein the GUI and the display are to provide selectable components forming at least one IVR queue to customize for the respective one of the plurality of remotely-situated client entities to handle the incoming communications via selectable components, wherein the selectable components include a selectable component to allow a created IVR queue to be labeled for subsequent retrieval and further include three or more of the following: menu, exit or terminate, play message, do not call, dial, outcome, capture, say digits, post and match;
monitor, for select client entities among the plurality of remotely-situated client entities, communications placed to target recipients in a respective communications-based campaign, and a first communications-based campaign being from among the different campaigns;
determine a disposition for each respective monitored communication, based on parameters defined by or on behalf of the respective client entity and relating to measurable communications metrics;
compare attributes of other communications-based campaigns of the select client entities and attributes of a particular communications-based campaign associated with one of the select client entities; and
generate a contact list of target recipients for the particular communications-based campaign, based at least in part on the disposition of the monitored communications and the comparison of attributes of other communications-based campaigns of the select client entities.

16. The data communications server of claim 15, wherein the data communications server is to:

predict a success rate of the particular communications-based campaign based on the disposition of the monitored communications and the comparison of the attributes; and provide suggested modifications to the particular communications-based campaign based on the predicted success rate.

17. The data communications server of claim 16, wherein the attributes which are used to analyze campaign performance and determine success of a particular communications-based campaign, are customized by each respective client entity among the select client entities.

18. The data communications server of claim 15, wherein the data communications server is to provide for the select client entities, an automatic contact system to send the communications to the target recipients.

19. The data communications server of claim 15, wherein the data communications server is to:

aggregate data regarding communications-based campaigns conducted by the select client entities, including attributes of each respective communications-based campaign;

identify communications-based campaigns having a similar method to analyze campaign performance to the particular communications-based campaign; and generate a contact list of target recipients for the particular communications-based campaign based on a comparison of the particular communications-based campaign and the identified communications-based campaigns.

20. The data communications server of claim 15, wherein the data communications server is to:

aggregate data regarding communications-based campaigns conducted by the select client entities, including attributes of each respective communications-based campaign;

identify communications-based campaigns having a similar method to analyze campaign performance to the particular communications-based campaign; and generate a contact list of target recipients for a second communications-based campaign based on a comparison of the second communications-based campaign and the identified communications-based campaigns.

* * * * *